(12) United States Patent
Carter

(10) Patent No.: US 11,707,961 B1
(45) Date of Patent: Jul. 25, 2023

(54) ACTUATOR WITH REINFORCING STRUCTURE FOR TORSION RESISTANCE

(71) Applicant: Troy A. Carter, Sunnyvale, CA (US)

(72) Inventor: Troy A. Carter, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 201 days.

(21) Appl. No.: 17/194,647

(22) Filed: Mar. 8, 2021

Related U.S. Application Data

(60) Provisional application No. 63/016,411, filed on Apr. 28, 2020.

(51) Int. Cl.
| | |
|---|---|
| *B60G 17/052* | (2006.01) |
| *F16F 9/04* | (2006.01) |
| *F16F 9/05* | (2006.01) |
| *B60G 11/27* | (2006.01) |
| *F16H 25/22* | (2006.01) |

(Continued)

(52) U.S. Cl.
CPC .......... *B60G 17/0521* (2013.01); *B60G 11/27* (2013.01); *F16F 9/0409* (2013.01); *F16F 9/05* (2013.01); *F16H 25/2204* (2013.01); *B60G 17/0155* (2013.01); *B60G 2202/15* (2013.01); *B60G 2204/126* (2013.01); *B60G 2204/419* (2013.01); *B60G 2204/62* (2013.01); *B60G 2206/42* (2013.01); *B60G 2206/7101* (2013.01); *B60G 2500/30* (2013.01); *B60G 2600/18* (2013.01); *B60G 2800/162* (2013.01); *B60G 2800/914* (2013.01); *F16F 9/50* (2013.01); *F16F 2222/126* (2013.01); *F16F 2224/0241* (2013.01); *F16F 2228/066* (2013.01); *F16F 2230/18* (2013.01); *F16F 2232/08* (2013.01);

(Continued)

(58) Field of Classification Search
None
See application file for complete search history.

(56) References Cited

U.S. PATENT DOCUMENTS

| | | | |
|---|---|---|---|
| 2,757,938 A | 8/1956 | Crowder | |
| 2,901,239 A | 8/1959 | Sethna | |

(Continued)

FOREIGN PATENT DOCUMENTS

| | | | |
|---|---|---|---|
| CN | 108215946 A | 6/2018 | |
| CN | 208439009 U | 1/2019 | |

(Continued)

OTHER PUBLICATIONS

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

(Continued)

*Primary Examiner* — Faye M Fleming
(74) *Attorney, Agent, or Firm* — Young Basile Hanlon & MacFarlane, P.C.

(57) ABSTRACT

A suspension actuator includes a first housing part, a second housing part, a ball screw actuator that is connected to the first housing part and to the second housing part, and an air spring membrane that is connected to the first housing part and to the second housing part. The air spring membrane includes a flexible material and a reinforcing structure that is disposed within the flexible material to resist torsion loads that are applied to the second housing part by the ball screw actuator.

20 Claims, 6 Drawing Sheets

(51) Int. Cl.
*F16H 25/20* (2006.01)
*B60G 17/015* (2006.01)
*F16F 9/50* (2006.01)

(52) U.S. Cl.
CPC .. *F16F 2234/02* (2013.01); *F16H 2025/2075* (2013.01)

(56) References Cited

U.S. PATENT DOCUMENTS

| | | |
|---|---|---|
| 2,913,252 A | 11/1959 | Norrie |
| 3,089,710 A | 5/1963 | Fiala |
| 3,236,334 A | 2/1966 | Wallerstein, Jr. |
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,659,106 A | 4/1987 | Fujita et al. |
| 4,722,516 A * | 2/1988 | Gregg ............... F16F 9/38 267/64.27 |
| 4,741,517 A * | 5/1988 | Warmuth, II ........ F16F 9/05 267/64.27 |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,027,048 A | 6/1991 | Masrur et al. |
| 5,033,028 A | 7/1991 | Browning |
| 5,060,959 A | 10/1991 | Davis et al. |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,170,838 B1 | 1/2001 | Laurent et al. |
| 6,233,510 B1 | 5/2001 | Platner et al. |
| 6,249,728 B1 | 6/2001 | Streiter |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,398,236 B1 | 6/2002 | Richardson |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,746,031 B2 | 6/2004 | Carlstedt |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,243,949 B2 | 7/2007 | Valdez et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,525,453 B2 | 9/2013 | Ogawa |
| 8,548,678 B2 | 10/2013 | Ummethala et al. |
| 8,579,311 B2 | 11/2013 | Butlin, Jr. et al. |
| 8,598,831 B2 | 12/2013 | Ogawa et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,156,519 B2 | 10/2015 | Ripa |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |

(56) References Cited

U.S. PATENT DOCUMENTS

| | | | |
|---|---|---|---|
| 9,527,359 B2 | 12/2016 | Son | |
| 9,533,539 B2 | 1/2017 | Eng et al. | |
| 9,550,495 B2 | 1/2017 | Tatourian et al. | |
| 9,625,902 B2 | 4/2017 | Knox | |
| 9,643,467 B2 | 5/2017 | Selden et al. | |
| 9,702,349 B2 | 7/2017 | Anderson et al. | |
| 9,855,887 B1 | 1/2018 | Potter et al. | |
| 9,868,332 B2 | 1/2018 | Anderson et al. | |
| 9,975,391 B2 | 5/2018 | Tseng et al. | |
| 10,065,474 B2 | 9/2018 | Trangbaek | |
| 10,081,408 B2 | 9/2018 | Yoshida | |
| 10,093,145 B1 | 10/2018 | Vaughan et al. | |
| 10,245,984 B2 | 4/2019 | Parker et al. | |
| 10,300,760 B1 | 5/2019 | Aikin et al. | |
| 10,315,481 B2 | 6/2019 | Lu et al. | |
| 10,377,371 B2 | 8/2019 | Anderson et al. | |
| 10,407,035 B1 | 9/2019 | Gadda et al. | |
| 10,513,161 B2 | 12/2019 | Anderson et al. | |
| 11,173,982 B2 | 11/2021 | Angell | |
| 11,179,991 B1 | 11/2021 | Carter | |
| 11,358,431 B2 * | 6/2022 | Hall | B60G 17/052 |
| 2001/0045719 A1 | 11/2001 | Smith | |
| 2002/0190486 A1 | 12/2002 | Phillis et al. | |
| 2003/0030241 A1 | 2/2003 | Lawson | |
| 2003/0080526 A1 | 5/2003 | Conover | |
| 2004/0054455 A1 | 3/2004 | Voight et al. | |
| 2004/0074720 A1 | 4/2004 | Thieltges | |
| 2004/0094912 A1 | 5/2004 | Niwa et al. | |
| 2004/0226788 A1 | 11/2004 | Tanner | |
| 2004/0245732 A1 | 12/2004 | Kotulla et al. | |
| 2005/0051986 A1 | 3/2005 | Galazin et al. | |
| 2005/0062251 A1 | 3/2005 | Ramsey | |
| 2005/0096171 A1 | 5/2005 | Brown et al. | |
| 2005/0199457 A1 | 9/2005 | Beck | |
| 2005/0206231 A1 | 9/2005 | Lu et al. | |
| 2005/0211516 A1 | 9/2005 | Kondo et al. | |
| 2005/0247496 A1 | 11/2005 | Nagaya | |
| 2006/0043804 A1 | 3/2006 | Kondou | |
| 2006/0076828 A1 | 4/2006 | Lu et al. | |
| 2006/0119064 A1 | 6/2006 | Mizuno et al. | |
| 2006/0181034 A1 | 8/2006 | Wilde et al. | |
| 2006/0266599 A1 | 11/2006 | Denys et al. | |
| 2006/0273530 A1 | 12/2006 | Zuber | |
| 2007/0069496 A1 | 3/2007 | Rinehart et al. | |
| 2007/0107959 A1 | 5/2007 | Suzuki et al. | |
| 2007/0114706 A1 | 5/2007 | Myers | |
| 2007/0199750 A1 | 8/2007 | Suzuki et al. | |
| 2007/0210539 A1 | 9/2007 | Hakui et al. | |
| 2008/0017462 A1 | 1/2008 | Mizutani et al. | |
| 2008/0100020 A1 | 5/2008 | Gashi et al. | |
| 2008/0111334 A1 | 5/2008 | Inoue et al. | |
| 2008/0164111 A1 | 7/2008 | Inoue et al. | |
| 2008/0185807 A1 | 8/2008 | Takenaka | |
| 2008/0283315 A1 | 11/2008 | Suzuki et al. | |
| 2009/0033055 A1 | 2/2009 | Morris et al. | |
| 2009/0064808 A1 | 3/2009 | Parison et al. | |
| 2009/0095584 A1 | 4/2009 | Kondo et al. | |
| 2009/0120745 A1 | 5/2009 | Kondo et al. | |
| 2009/0121398 A1 | 5/2009 | Inoue | |
| 2009/0173585 A1 | 7/2009 | Kappagantu | |
| 2009/0174158 A1 | 7/2009 | Anderson et al. | |
| 2009/0198419 A1 | 8/2009 | Clark | |
| 2009/0218867 A1 | 9/2009 | Clark | |
| 2009/0243402 A1 | 10/2009 | O'Day et al. | |
| 2009/0243598 A1 | 10/2009 | O'Day | |
| 2009/0273147 A1 | 11/2009 | Inoue et al. | |
| 2009/0286910 A1 | 11/2009 | Bloomfield | |
| 2009/0302559 A1 | 12/2009 | Doerfel | |
| 2009/0321201 A1 | 12/2009 | Sakuta et al. | |
| 2010/0044977 A1 | 2/2010 | Hughes et al. | |
| 2010/0059959 A1 | 3/2010 | Kim | |
| 2010/0200343 A1 | 8/2010 | Kondo et al. | |
| 2010/0207344 A1 | 8/2010 | Nakamura | |
| 2010/0222960 A1 | 9/2010 | Oida et al. | |
| 2010/0230876 A1 | 9/2010 | Inoue et al. | |
| 2010/0252376 A1 | 10/2010 | Chern et al. | |
| 2010/0253019 A1 | 10/2010 | Ogawa | |
| 2010/0327573 A1 | 12/2010 | Bums | |
| 2011/0115183 A1 | 5/2011 | Alesso et al. | |
| 2012/0013277 A1 | 1/2012 | Ogawa | |
| 2012/0059547 A1 | 3/2012 | Chen et al. | |
| 2012/0109483 A1 | 5/2012 | O'Dea et al. | |
| 2012/0153718 A1 | 6/2012 | Rawlinson et al. | |
| 2012/0181757 A1 | 7/2012 | Oteman et al. | |
| 2012/0187640 A1 | 7/2012 | Kondo et al. | |
| 2012/0193847 A1 | 8/2012 | Muragishi et al. | |
| 2012/0305348 A1 | 12/2012 | Katayama et al. | |
| 2012/0306170 A1 | 12/2012 | Serbu et al. | |
| 2013/0060422 A1 | 3/2013 | Ogawa et al. | |
| 2013/0060423 A1 | 3/2013 | Jolly | |
| 2013/0099459 A1 | 4/2013 | Remboski et al. | |
| 2013/0106074 A1 | 5/2013 | Koku et al. | |
| 2013/0221625 A1 | 8/2013 | Pare et al. | |
| 2013/0229074 A1 | 9/2013 | Haferman et al. | |
| 2013/0233632 A1 | 9/2013 | Kim et al. | |
| 2013/0253764 A1 | 9/2013 | Kikuchi et al. | |
| 2013/0341143 A1 | 12/2013 | Brown | |
| 2014/0005888 A1 | 1/2014 | Bose et al. | |
| 2014/0145498 A1 | 5/2014 | Yamakado et al. | |
| 2014/0156143 A1 | 6/2014 | Evangelou et al. | |
| 2014/0260233 A1 | 9/2014 | Giovanardi et al. | |
| 2014/0312580 A1 | 10/2014 | Gale | |
| 2014/0345450 A1 | 11/2014 | Leonard et al. | |
| 2014/0358378 A1 | 12/2014 | Howard et al. | |
| 2015/0123370 A1 | 5/2015 | Lee et al. | |
| 2015/0197130 A1 | 7/2015 | Smith et al. | |
| 2015/0224845 A1 | 8/2015 | Anderson et al. | |
| 2015/0231942 A1 | 8/2015 | Trangbaek et al. | |
| 2015/0343876 A1 | 12/2015 | Yoshizawa et al. | |
| 2016/0059658 A1 | 3/2016 | Kuriki | |
| 2016/0096458 A1 | 4/2016 | Parker et al. | |
| 2016/0159187 A1 | 6/2016 | Mohamed | |
| 2016/0167743 A1 | 6/2016 | Melcher | |
| 2016/0200164 A1 | 7/2016 | Tabata et al. | |
| 2016/0291574 A1 | 10/2016 | Parison | |
| 2016/0339823 A1 | 11/2016 | Smith et al. | |
| 2016/0347143 A1 | 12/2016 | Hrovat et al. | |
| 2017/0047823 A1 | 2/2017 | Sangermano, III et al. | |
| 2017/0100980 A1 | 4/2017 | Tsuda | |
| 2017/0129367 A1 | 5/2017 | Hein | |
| 2017/0129371 A1 | 5/2017 | Knox | |
| 2017/0129372 A1 | 5/2017 | Hein et al. | |
| 2017/0129373 A1 | 5/2017 | Knox et al. | |
| 2017/0137023 A1 | 5/2017 | Anderson et al. | |
| 2017/0144501 A1 | 5/2017 | Wall | |
| 2017/0203673 A1 | 7/2017 | Parker et al. | |
| 2017/0240018 A1 | 8/2017 | Mettrick et al. | |
| 2017/0241504 A1 | 8/2017 | Delorenzis et al. | |
| 2017/0253101 A1 | 9/2017 | Kuriki | |
| 2017/0253155 A1 | 9/2017 | Knox et al. | |
| 2018/0015801 A1 | 1/2018 | Mohamed et al. | |
| 2018/0022178 A1 | 1/2018 | Xi | |
| 2018/0029585 A1 | 2/2018 | Tanimoto | |
| 2018/0056748 A1 | 3/2018 | Grimes | |
| 2018/0065438 A1 | 3/2018 | Ogawa et al. | |
| 2018/0079272 A1 | 3/2018 | Aikin | |
| 2018/0089901 A1 | 3/2018 | Rober et al. | |
| 2018/0105082 A1 | 4/2018 | Knox | |
| 2018/0126816 A1 | 5/2018 | Kondo et al. | |
| 2018/0134111 A1 | 5/2018 | Toyohira et al. | |
| 2018/0162186 A1 | 6/2018 | Anderson et al. | |
| 2018/0162187 A1 | 6/2018 | Trangbaek | |
| 2018/0195570 A1 | 7/2018 | Churchill et al. | |
| 2018/0208009 A1 | 7/2018 | McGuire et al. | |
| 2018/0222274 A1 | 8/2018 | Davis et al. | |
| 2018/0297587 A1 | 10/2018 | Kasaiezadeh Mahabadi et al. | |
| 2018/0345747 A1 | 12/2018 | Boon et al. | |
| 2018/0370314 A1 | 12/2018 | Higle | |
| 2019/0023094 A1 | 1/2019 | Panagis et al. | |
| 2019/0118604 A1 | 4/2019 | Suplin et al. | |
| 2019/0248203 A1 | 8/2019 | Krehmer et al. | |
| 2019/0308484 A1 | 10/2019 | Belter et al. | |
| 2020/0088214 A1 | 3/2020 | Woodard et al. | |
| 2020/0171907 A1 | 6/2020 | Hall et al. | |

(56) References Cited

U.S. PATENT DOCUMENTS

| | | | |
|---|---|---|---|
| 2020/0180386 A1 | 6/2020 | Tabata et al. | |
| 2020/0216128 A1 | 7/2020 | Doerksen | |
| 2021/0061046 A1 | 3/2021 | Simon et al. | |

FOREIGN PATENT DOCUMENTS

| | | | |
|---|---|---|---|
| DE | 19853876 A1 | 5/2000 | |
| DE | 19850169 C1 | 7/2000 | |
| DE | 102009060213 A1 | 6/2011 | |
| DE | 102010041404 A1 | 3/2012 | |
| DE | 202012002846 U1 | 7/2012 | |
| DE | 102015003530 A1 | 9/2016 | |
| DE | 102016000686 A1 | 7/2017 | |
| DE | 102018208774 A1 | 12/2019 | |
| EP | 1440826 A2 | 7/2004 | |
| EP | 1693233 B1 | 4/2009 | |
| EP | 2072855 A1 | 6/2009 | |
| EP | 2233330 B1 | 2/2013 | |
| EP | 3088230 A1 | 11/2016 | |
| GB | 2220625 A | 1/1990 | |
| GB | 2437633 A | 10/2007 | |
| JP | H0475248 U | * 6/1992 | |
| JP | 2004155258 A | 6/2004 | |
| JP | 2006200734 A | 8/2006 | |
| JP | 2012002300 A | 1/2012 | |
| JP | 2012167757 A | 9/2012 | |
| JP | 2013244841 A | 12/2013 | |
| JP | 5796315 B2 | 10/2015 | |
| KR | 101509600 B1 | 4/2015 | |
| KR | 20170095073 A | 8/2017 | |
| WO | 9304883 A1 | 3/1993 | |
| WO | 2011148792 A1 | 12/2011 | |
| WO | 2012028228 A2 | 3/2012 | |
| WO | 2014004118 A1 | 1/2014 | |
| WO | 2014004119 A1 | 1/2014 | |
| WO | 2014094934 A1 | 6/2014 | |
| WO | 2015153811 A1 | 10/2015 | |
| WO | 2015169530 A1 | 11/2015 | |
| WO | 2016120044 A1 | 8/2016 | |
| WO | 2017055151 A1 | 4/2017 | |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

daimler.com, "Suspension: The world's first suspension system with 1 eyes2 ", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

* cited by examiner

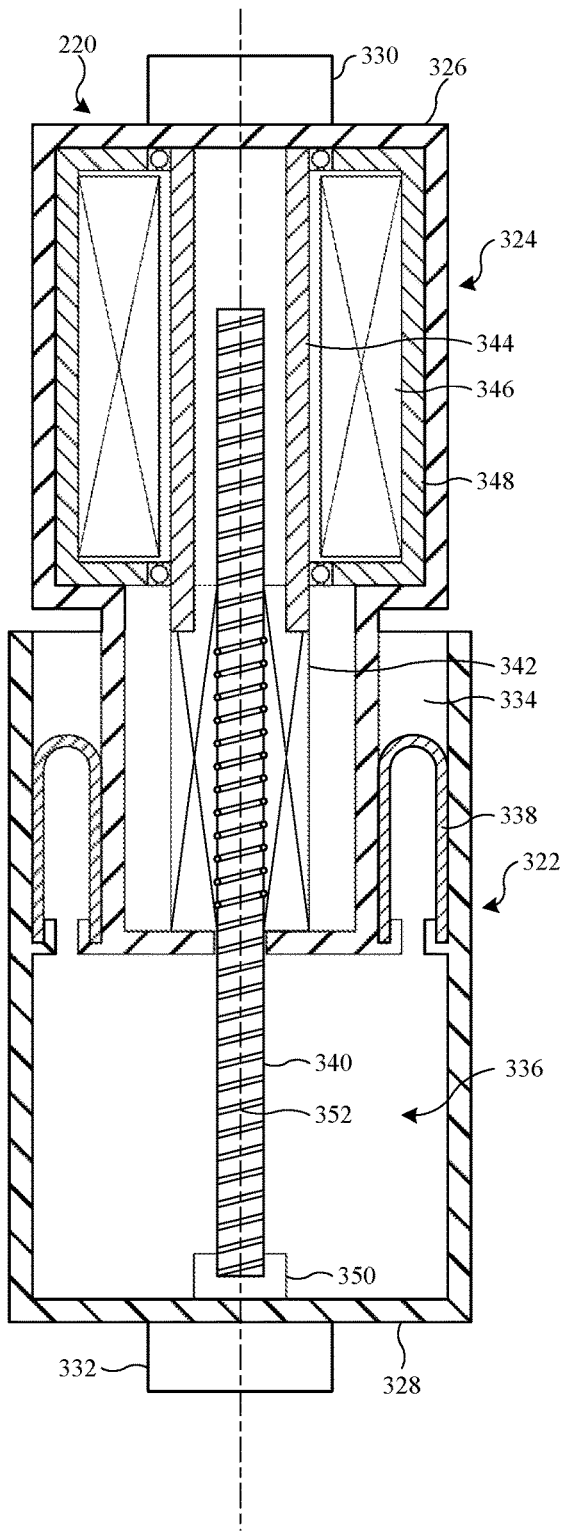
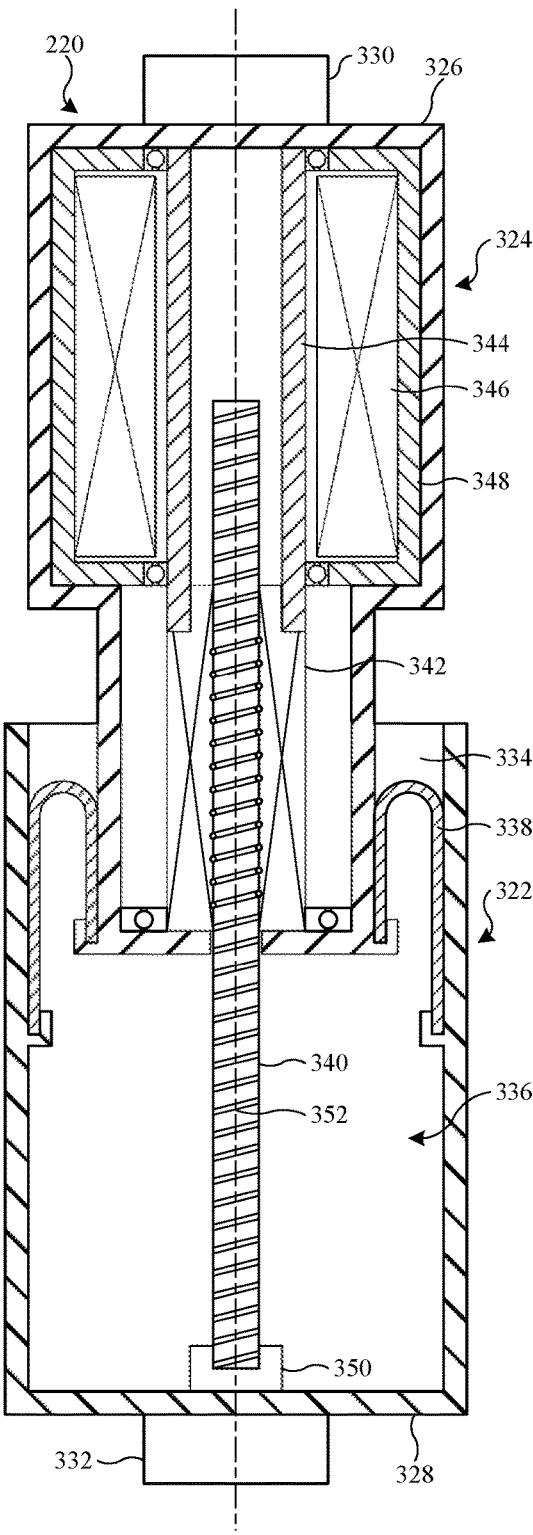
*FIG. 3*  *FIG. 4*

ACTUATOR WITH REINFORCING STRUCTURE FOR TORSION RESISTANCE

CROSS-REFERENCE TO RELATED APPLICATIONS

This application claims the benefit of U.S. Patent Application No. 63/016,411, filed on Apr. 28, 2020, the content of which is hereby incorporated by reference in its entirety for all purposes.

TECHNICAL FIELD

This disclosure relates to actuators with reinforcing structures for torsion resistance.

BACKGROUND

Actuators can apply forces between a sprung mass and an unsprung mass. Using input from sensors, actuators can absorb energy to reduce vibrations experienced by occupants. Active Actuators can also control ride height.

SUMMARY

One aspect of the disclosed is a suspension actuator. The suspension actuator includes a first housing part, a second housing part, a ball screw actuator that is connected to the first housing part and to the second housing part, and an air spring membrane that is connected to the first housing part and to the second housing part. The air spring membrane includes a flexible material and a reinforcing structure that is disposed within the flexible material to resist torsion loads that are applied to the second housing part by the ball screw actuator.

In some implementations of the suspension actuator, the reinforcing structure includes cords that are arranged at a non-zero angle relative to an axial direction of the suspension actuator, the cords are formed from a textile material, the air spring membrane is connected to the first housing part and to the second housing part in a rolling lobe configuration, the air spring membrane is part of an air spring that includes a working gas that is disposed in an internal chamber that is defined in the first housing part and the second housing part, the ball screw actuator includes a rotor, the ball screw actuator includes a stator that is operable to rotate the rotor as a result of electromagnetic interaction between the stator and the rotor, the ball screw actuator includes a shaft that is connected to the second housing part, and the ball screw actuator includes a ball nut that is connected to the rotor and engages the shaft to linearly translate the shaft with respect to the ball nut in response to rotation of the ball nut.

In some implementations of the suspension actuator, the reinforcing structure of the air spring membrane includes cords that are arranged at a non-zero angle relative to an axial direction of the suspension actuator.

In some implementations of the suspension actuator, the cords of the reinforcing structure of the air spring membrane are formed from a textile material. In some implementations of the suspension actuator, the cords of the reinforcing structure of the air spring membrane are formed from metal.

In some implementations of the suspension actuator, the reinforcing structure of the air spring membrane includes a first reinforcing layer having first cords that are arranged at a first non-zero angle relative to an axial direction of the suspension actuator and the reinforcing structure of the air spring membrane includes a second reinforcing layer having second cords that are arranged at a second non-zero angle relative to the axial direction of the suspension actuator.

In some implementations of the suspension actuator, the first cords and the second cords define a crisscross pattern.

In some implementations of the suspension actuator, the air spring membrane is connected to the first housing part and to the second housing part in a rolling lobe configuration.

In some implementations of the suspension actuator, the ball screw actuator includes a rotor, a stator that is operable to rotate the rotor as a result of electromagnetic interaction between the stator and the rotor, a shaft that is connected to the second housing part, and a ball nut that is connected to the rotor and engages the shaft to linearly translate the shaft with respect to the ball nut in response to rotation of the ball nut.

In some implementations of the suspension actuator, the ball screw actuator does not include a ball spline nut that resists the torsion loads.

Another aspect of the disclosure is a suspension actuator that includes a top mount, a bottom mount, a first load path between the top mount and the bottom mount that includes an air spring, and a second load path between the top mount and the bottom mount that includes a screw actuator having an output torque. The air spring includes an air spring membrane having a flexible material and a reinforcing structure that is disposed within the flexible material to react the output torque of the screw actuator.

In some implementations of the suspension actuator, the reinforcing structure of the air spring membrane includes cords that are oriented to resist the output torque.

In some implementations of the suspension actuator, the air spring membrane is an annular structure and the cords of the reinforcing structure of the air spring membrane extend in a circumferential direction of the air spring membrane.

In some implementations of the suspension actuator, the cords of the reinforcing structure of the air spring membrane are formed from a textile material.

In some implementations of the suspension actuator, the cords of the reinforcing structure of the air spring membrane are formed from metal.

In some implementations of the suspension actuator, the reinforcing structure of the air spring membrane includes a first reinforcing layer having first cords, the reinforcing structure of the air spring membrane includes a second reinforcing layer having second cords, and the first cords and the second cords are arranged in a grid pattern.

Another aspect of the disclosure is a vehicle that includes a vehicle body, a wheel assembly, and a suspension actuator. The suspension actuator includes a top mount that is connected to the vehicle body, a bottom mount that is connected to the wheel assembly, a first housing part that is connected to the top mount, a second housing part that is connected to the bottom mount, a ball screw actuator and an air spring membrane. The ball screw actuator has a stator that is connected to the first housing part, a rotor that is rotated by electromagnetic interaction between the rotor and the stator, a shaft that is connected to the second housing part, and a ball nut that is connected to the stator and is engaged with the shaft to linearly translate the shaft in response to rotation of the ball nut. The air spring membrane is connected to the first housing part and to the second housing part in a rolling lobe configuration. The air spring membrane includes a flexible material, a first layer of cords that are disposed in the flexible material, and a second layer of cords that are oriented at a non-zero angle with respect to the first layer of cords, wherein the first layer of cords and the second layer of cords cooperate to resist torsion loads that are applied to the second housing part by the ball screw actuator.

In some implementations of the vehicle, the first layer of cords and the second layer of cords define a grid pattern.

In some implementations of the vehicle, the first layer of cords and the second layer of cords each include reinforcing cords that are formed from a textile material.

In some implementations of the vehicle, the first layer of cords and the second layer of cords each include reinforcing cords that are formed from metal.

BRIEF DESCRIPTION OF THE DRAWINGS

FIG. 3 is a schematic cross-section view of a suspension actuator in a first position.

FIG. 4 is a schematic cross-section view of the suspension actuator in a second position.

DETAILED DESCRIPTION

In an active suspension system that utilizes a ball screw actuator, an electric motor is used to rotate a ball screw nut, which causes linear motion of a shaft that is engaged with the ball screw nut. Linear motion of the shaft occurs because the shaft is restrained from rotating. As an example, a ball spline nut can engage linear grooves that are formed in the shaft, which applies a reaction torque that restrains rotation of the shaft. If no reaction torque were applied to the shaft, the shaft would rotate in unison with the ball screw nut instead of translating linearly.

The active suspension actuators that are described herein include an air spring that is reinforced so that it has torsion load resistance that is sufficient to withstand torsional loads applied by the ball screw actuator. Thus, the reaction torque needed to restrain rotation of the shaft is generated by the air spring. Because the air spring restrains rotation of the shaft, the active suspension actuator does not include a mechanical element, such as a ball spline nut, that directly engages the shaft to restrain rotation of the shaft. By eliminating a mechanical element that directly engages the shaft to restrain rotation, the overall length of the active suspension actuator may be decreased, and the overall weight of the active suspension actuators may be decreased.

Figure 1:
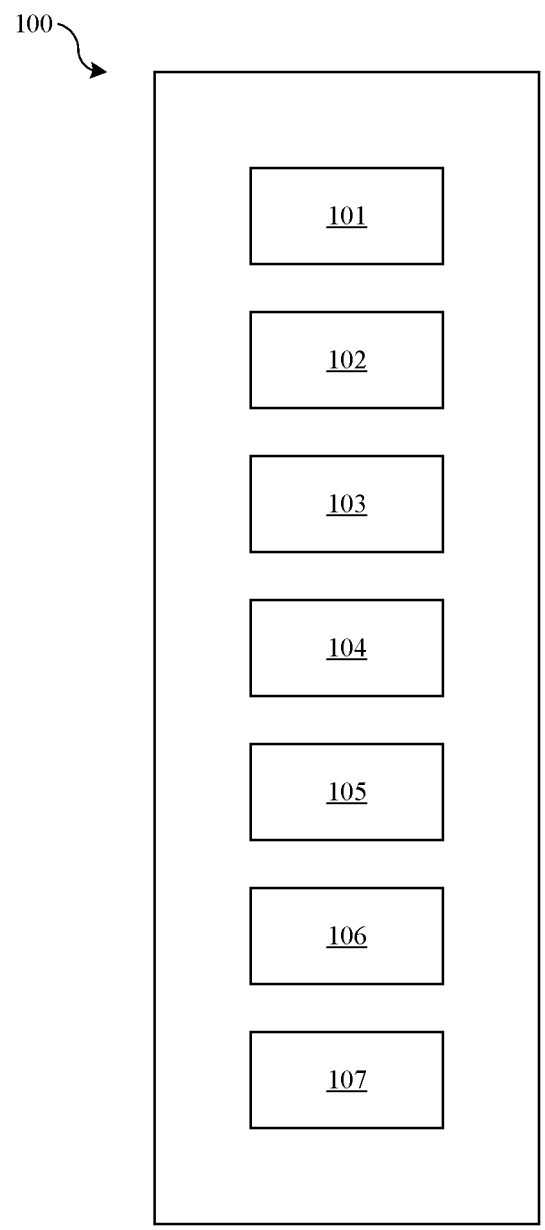
FIG. 1 is a block diagram that shows a vehicle.

FIG. 1 is a block diagram that shows a vehicle 100. As an example, the vehicle 100 may be a conventional road-going vehicle that is supported by wheels and tires (e.g., four wheels and tires). As an example, the vehicle 100 may be a passenger vehicle that includes a passenger compartment that is configured to carry one or more passengers. As another example, the vehicle 100 may be a cargo vehicle that is configured to carry cargo items in a cargo compartment.

In the illustrated implementation, the vehicle 100 includes a vehicle body 101, a suspension system 102, a propulsion system 103, a braking system 104, a steering system 105, a sensing system 106, and a control system 107. These are examples of vehicle systems that are included in the vehicle 100. Other systems can be included in the vehicle 100.

The vehicle body 101 is a structural component of the vehicle 100 through which other components are interconnected and supported. The vehicle body 101 may, for example, include or define a passenger compartment for carrying passengers. The vehicle body 101 may include structural components (e.g., a frame, subframe, unibody, monocoque, etc.) and aesthetic components (e.g., exterior body panels).

The suspension system 102 supports a sprung mass of the vehicle 100 with respect to an unsprung mass of the vehicle 100. The suspension system 102 is an active suspension system that is configured to control generally vertical motion of the wheels. Broadly speaking, the suspension system 102 controls vertical motion of the wheels of the vehicle 100 relative to the vehicle body 101, for example, to ensure contact between the wheels and a surface of a roadway and to reduce undesirable movements of the vehicle body 101. The suspension system 102 includes components (e.g., actuators) that are configured to transfer energy into and absorb energy from the wheels, such as by applying upward and downward forces to introduce energy into and absorb energy from the wheels. The components of the suspension system 102 may be operated in accordance with signals from sensors in the sensing system 106 and under control from the control system 107, for example, in the form of commands transmitted from the control system 107 to the suspension system 102.

The propulsion system 103 includes propulsion components that are configured to cause motion of the vehicle 100 (e.g., accelerating the vehicle 100). The propulsion system 103 may include components such that are operable to generate torque and deliver that torque to one or more wheels (e.g., road wheels that contact the road through tires mounted on the road wheels). Examples of components that may be included in the propulsion system 103 include motors, gearboxes, and propulsion linkages (e.g., drive shafts, half shafts, etc.). Motors included in the propulsion system 103 may be, as examples, an internal combustion engine powered by a combustible fuel or one or more electric motors that are powered by electricity (e.g., from a battery). Electric motors that are included in the propulsion system 103 may further be configured to operate as generators that charge the battery in a regenerative braking configuration.

The braking system 104 provides deceleration torque for decelerating the vehicle 100. The braking system 104 may include friction braking components such as disk brakes or drum brakes. The braking system 104 may use an electric motor of the propulsion system to decelerate the vehicle by electromagnetic resistance, which may be part of battery charging in a regenerative braking configuration.

The steering system 105 is operable to cause the vehicle to turn by changing a steering angle of one or more wheels of the vehicle 100. As one example, one or more wheels of the vehicle may each include an independently operated steering actuator. As another example, two wheels of the vehicle 100 may be connected by steering linkages to a single steering actuator or to a manually operated steering device.

The sensing system 106 includes sensors for observing external conditions of the environment around the vehicle 100 (e.g., location of the roadway and other objects) and conditions of the vehicle 100 (e.g., acceleration and conditions of the various systems and their components). The sensing system 106 may include sensors of various types, including dedicated sensors and/or components of the various systems. For example, actuators may incorporate sensors or portions of actuators may function as sensors such as by measuring current draw of an electric motor incorporated in an actuator. The suspension system 102 may, for example, be controlled using acceleration sensors that are connected to a sprung mass of the vehicle 100, to an unsprung mass of the vehicle 100, and/or to one or more suspension actuators of the vehicle 100.

The control system 107 includes communication components (i.e., for receiving sensor signals and sending control signals) and processing components (i.e., for processing the sensor signals and determining control operations), such as a controller. The control system 107 may be a single system or multiple related systems. For example, the control system 107 may be a distributed system including components that are included in other systems of the vehicle 100, such as the suspension system 102, the propulsion system 103, the braking system 104, the steering system 105, the sensing system 106, and/or other systems.

Figure 2:
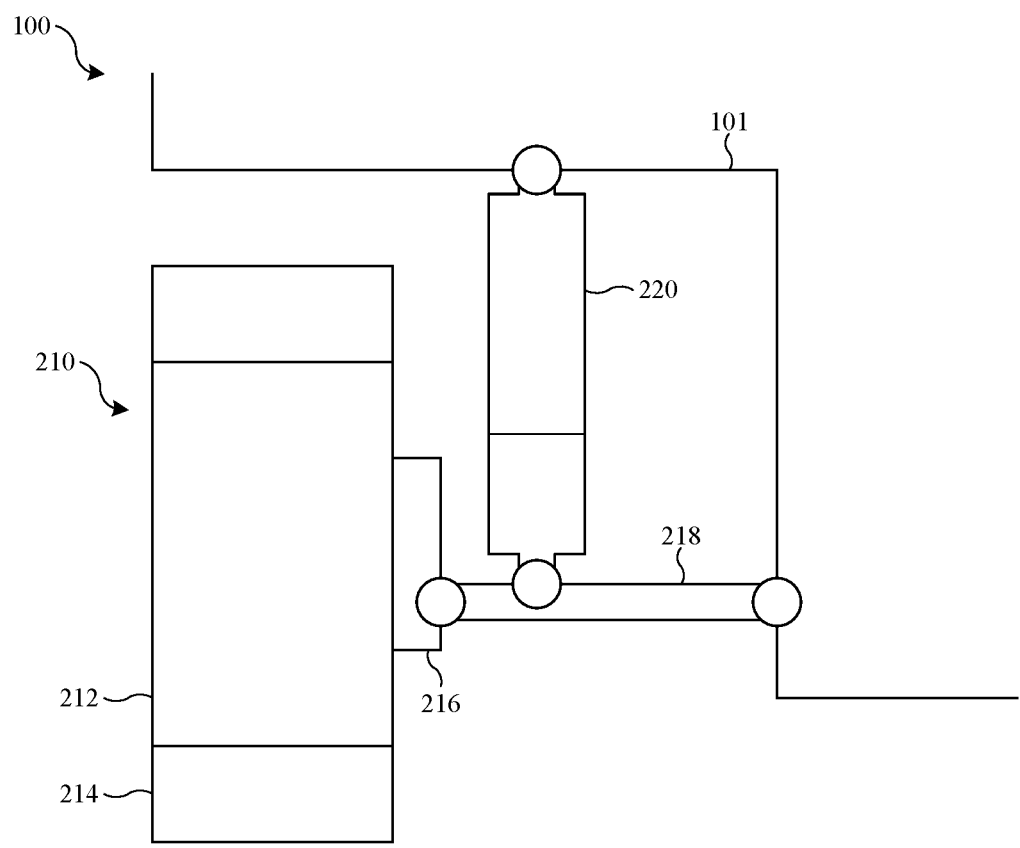
FIG. 2 is an illustration that shows connection of a wheel assembly of the vehicle to a vehicle body of the vehicle.

FIG. 2 is an illustration that shows connection of a wheel assembly 210 of the vehicle 100 of the vehicle body 101. The wheel assembly 210 is a road-contacting wheel assembly that include a wheel rim 212 and a tire 214 that is mounted on the wheel rim 212. The wheel rim 212 is supported by connection to a wheel hub 216 so that the wheel assembly 210 is able to rotate (e.g., by a wheel bearing that is included in the wheel hub 216). The wheel hub 216 is connected to the vehicle body 101 so that the wheel assembly 210 is able to translate in a generally vertical direction. In the illustrated example, the wheel hub 216 is connected to the vehicle body 101 by a control arm 218 having an outer end that is pivotally connected to the wheel hub 216 and an inner end that is pivotally connected to the vehicle body 101.

The suspension system 102 includes a suspension actuator 220 that controls the motion (e.g., translation in the generally vertical direction) of the wheel assembly 210. The suspension actuator 220 is an active suspension component that is operable to actively apply forces to the wheel assembly 210 as previously described. The suspension actuator 220 may be connected so that it is able to apply forces between the wheel assembly 210 and the vehicle body 101, whether connected directly or indirectly to the wheel assembly 210 and/or the vehicle body 101. In the illustrated example, an upper end of the suspension actuator 220 is connected to the vehicle body 101 and a lower end of the suspension actuator 220 is connected to the control arm 218. Other configurations may be used to connect the suspension actuator 220 to apply forces between the wheel assembly 210 and the vehicle body 101. For example, the upper end of the suspension actuator 220 may be connected to the vehicle body 101 and the lower end of the suspension actuator 220 may be connected, as examples to the wheel hub 216 or to a component that is connected to the wheel hub 216, such as a steering knuckle.

FIG. 3 is a schematic cross-section view of the suspension actuator 220 in a first position, and FIG. 4 is a schematic cross-section view of the suspension actuator 220 in a second position. The first position corresponds to a first length of the suspension actuator 220. The second position corresponds to a second length of the suspension actuator 220, and the second length is longer than the first length. The suspension actuator is configured to move between the first position and the second position by extension and retraction. The suspension actuator 220 is able to extend (e.g., lengthen) to move from the first position to the second position. The suspension actuator 220 is able to retract (e.g., shorten) to move from the second position to the first position.

The upper end of the suspension actuator 220 is connected to the sprung mass of the vehicle 100, such as by connection to the vehicle body 101. The lower end of the suspension actuator 220 is connected to the unsprung mass of the vehicle 100 by connection to a component that supports the wheel assembly 210, such as the control arm 218 or the wheel hub 216. The suspension actuator 220 defines a first load path between the vehicle body 101 and the wheel assembly 210 through an air spring 322. The suspension actuator 220 also defines a second load path between the vehicle body 101 and the wheel assembly 210 through a ball screw actuator 324. Thus, the suspension actuator 220 includes a first load path between the upper end and the lower end of the suspension actuator 220 that includes the air spring 322, and the suspension actuator 220 includes a second load path between the upper end and the lower end of the suspension actuator 220 that includes a screw actuator having an output torque, such as the ball screw actuator 324.

The first and second load paths cooperatively function to transfer force axially between the wheel assembly 210 and the vehicle body 101. The first load path is configured to carry a gravity preload of the vehicle 100 (i.e., load due to gravity irrespective of any dynamic loading) along with a portion of a dynamic load between the vehicle body 101 and the wheel assembly 210. The second load path is configured to carry another portion of the dynamic load between the vehicle body 101 and the wheel assembly 210 and, as compared to the first load path, provides primary damping functions of the suspension system 102. Stated differently, the first load path is intended to set a ride height for the vehicle 100 and is intended to absorb low-frequency vibrations, while the second load path is intended to absorb high-frequency vibrations.

The suspension actuator 220 includes a first housing part 326 and a second housing part 328. The first housing part 326 and the second housing part 328 are generally cylindrical structures that extend along a longitudinal axis of the suspension actuator 220. The first housing part 326 extends from the upper end of the suspension actuator along the longitudinal axis of the suspension actuator 220 toward the second housing part 328. The second housing part 328 extends upward from the lower end of the suspension actuator 220 along the longitudinal axis of the suspension actuator 220 toward the first housing part 326.

A top mount 330 is connected to the upper end of the first housing part 326. The top mount 330 is configured so that it is connectable (e.g., by fasteners, by a clamping structure, by a pin, by a ball joint, or by another fastening structure) to part of the sprung mass of the vehicle, 100 such as the vehicle body 101, to transfer forces between the sprung mass of the vehicle 100 (e.g., including the vehicle body 101 of the vehicle 100) and the suspension actuator 220. A bottom mount 332 is connected to the lower end of the second housing part 328. The bottom mount 332 is configured so that it is connectable (e.g., by fasteners, by a clamping structure, by a pin, by a ball joint, or by another fastening structure) to part of the unsprung mass of the vehicle 100, such as the control arm 218 or the wheel hub 216, to transfer forces between the unsprung mass of the vehicle 100 (e.g., including the wheel assembly 210 of the vehicle 100) and the suspension actuator 220.

The first housing part 326 and the second housing part 328 are telescopically related so that they can move longitudinally with respect to each other. Thus, the first housing part 326 and the second housing part 328 define an overlapping section in the longitudinal direction, wherein the overlapping section has a variable length according to extension and retraction of the suspension actuator 220. In the overlapping region, the first housing part 326 is spaced from the second housing part 328 in a radial direction (e.g., outward relative to a radial center of the suspension actuator 220) by a radial gap 334.

In the illustrated implementation, an inner diameter of the second housing part 328 is larger than an outer diameter of the first housing part 326 in the overlapping region so that a portion of the first housing part 326 is located inside the second housing part 328 within the overlapping region to define the telescopic relationship of the first housing part 326 and the second housing part 328. Alternatively, the first housing part 326 and the second housing part 328 may be configured so that an inner diameter of the first housing part 326 is larger than an outer diameter of the second housing part 328 in the overlapping region so that a portion of the second housing part 328 is located inside the first housing part 326 within the overlapping region to define the telescopic relationship of the first housing part 326 and the second housing part 328.

The first load path is defined between the top mount 330 and the bottom mount 332 of the suspension actuator 220 by an air spring 322. The air spring 322 is defined by an internal chamber 336 that is defined inside the suspension actuator 220, including by the first housing part 326 and the second housing part 328. The volume (e.g., the amount of space enclosed within the internal chamber measured, for example, in cubic centimeters or other units) of the internal chamber 336 varies in accordance with relative movement of the first housing part 326 and the second housing part 328. A working gas (e.g., air) is contained within the internal chamber 336 and increases and decreases in pressure in correspondence to relative movement of the first housing part 326 and the second housing part and the accompanying change in volume of the internal chamber 336. The internal chamber 336 is sealed to contain the gas within the internal chamber 336, for example, by inclusion of sealing structures included in the suspension actuator 220 that are, for example, connected to the first housing part 326 and the second housing part 328. The internal chamber 336 may include connections, for example, by valves, gas lines, and/or other structures, that allow supply of part of the working gas to the internal chamber 336 and allow discharge of part of the working gas from the internal chamber 336. This allows, for example, changes in the ride height of the vehicle 100.

To contain the working gas within the internal chamber 336 while allowing relative motion of the first housing part 326 and the second housing part 328 at the radial gap 334, the air spring 322 includes an air spring membrane 338. The air spring membrane 338 is a thin sheet of flexible material having an annular, tube-like configuration (e.g., a flexible sleeve). The air spring membrane 338 is connected to the first housing part 326 and the second housing part 328 at the radial gap 334 to prevent the working gas from escaping the internal chamber 336 at the radial gap 334 while allowing relative motion of first housing part 326 and the second housing part 328. The air spring membrane 338 may also be referred to as an air spring sleeve, an air sleeve, a diaphragm, or an air spring diaphragm.

The ball screw actuator 324 is a type of linear actuator that is utilized in the suspension actuator 220 as an active suspension component that is operable to apply forces between the top mount 330 and the bottom mount 332 of the suspension actuator 220. The ball screw actuator 324 is an example of a screw actuator, in which rotation of a screw or nut is used to cause linear motion of the other one of the screw or the nut, which translates with respect to the rotating component because it is restrained from rotating. Although the description herein is made with respect to the ball screw actuator 324, the suspension actuator 220 could be implemented using a screw actuator of another type, such as a lead screw actuator.

The ball screw actuator 324 defines the second load path through the suspension actuator 220 between the top mount 330 and the bottom mount 332 of the suspension actuator 220. The ball screw actuator 324 may be backdrivable so that it can allow extension and retraction of the suspension actuator 220 in response to external forces with no contrary force or assisting force applied by the ball screw actuator 324.

The ball screw actuator 324 includes a shaft 340, a ball nut 342, a rotor 344, a stator 346, a stator housing 348, and a shaft coupler 350. The ball screw actuator 324 does not include a structure that reacts torque applied to the shaft 340. For example, the ball screw actuator does not include a ball spline nut that resists torsion loads. In addition, the suspension actuator does not include a component that in engagement with the shaft 340 and the first housing part 326 to react torque through a rigid load path between the shaft 340 and the first housing part 326. In addition, the first housing part 326 and the second housing part 328 may be free from rigid structures that directly resist rotation of the second housing part 328 with respect to the first housing part 326. Instead, torsion loads are resisted by the air spring 322 as will be described further herein.

The ball screw actuator 324 is disposed within the first housing part 326 and the second housing part 328. The rotor 344 is a rotatable component in the form of a hollow, tubular structure that extends along the longitudinal axis of the suspension actuator 220. The stator 346 is arranged around and radially outward from the rotor 344. Using any suitable motor-generator configuration, the rotor 344 and the stator 346 are configured such that electromagnetic interaction of the rotor 344 and the stator 346 causes rotation of the rotor 344 when the stator 346 is energized (e.g., by selective energization of stator coils that are included in the stator 346). Thus, the stator 346 that is operable to rotate the rotor 344 as a result of electromagnetic interaction between the stator 346 and the rotor 344.

The stator 346 may be disposed in the stator housing 348. In addition to providing structural support for the stator 346, the stator housing 348 absorbs heat generated by the stator 346 when it is energized. Cooling features may be included in the ball screw actuator 324, for example, adjacent to the stator housing 348. As one example, liquid channels may be defined around the stator housing 348 are defined on an outside periphery of the stator housing 348 for circulating a liquid coolant that is able to absorb heat from the stator housing 348.

The ball nut 342 is a rotatable component of the ball screw actuator 324. The ball nut 342 is connected to the rotor 344 and is rotated in unison with the rotor 344. As the ball nut 342 is rotated by the rotor 344, the ball nut 342 engages the shaft 340 through engagement of recirculating ball bearings that are disposed in the ball nut 342 with a helical groove 352 that is formed on at least part of the shaft 340, which causes the shaft 340 to translate axially relative to the first housing part 326 in response to rotation of the ball nut 342. Thus, the shaft 340 is a translatable shaft, since it is able to translate linearly relative to portions of the suspension actuator 220, including the first housing part 326. The shaft 340 extends downward from the first housing part to the shaft coupler 350. The shaft coupler 350 connects the shaft 340 to the second housing part 328 near the lower end of the suspension actuator 220. The shaft coupler 350 may connect the shaft 340 to the second housing part 328 so that the shaft 340 is not able to rotate or translate with respect to the second housing part 328, for example, using conventional fasteners, coupling structures, welds, or other means. Thus, the shaft 340 is connected to the second housing part 328 by a fixed connecting structure.

Figure 5:
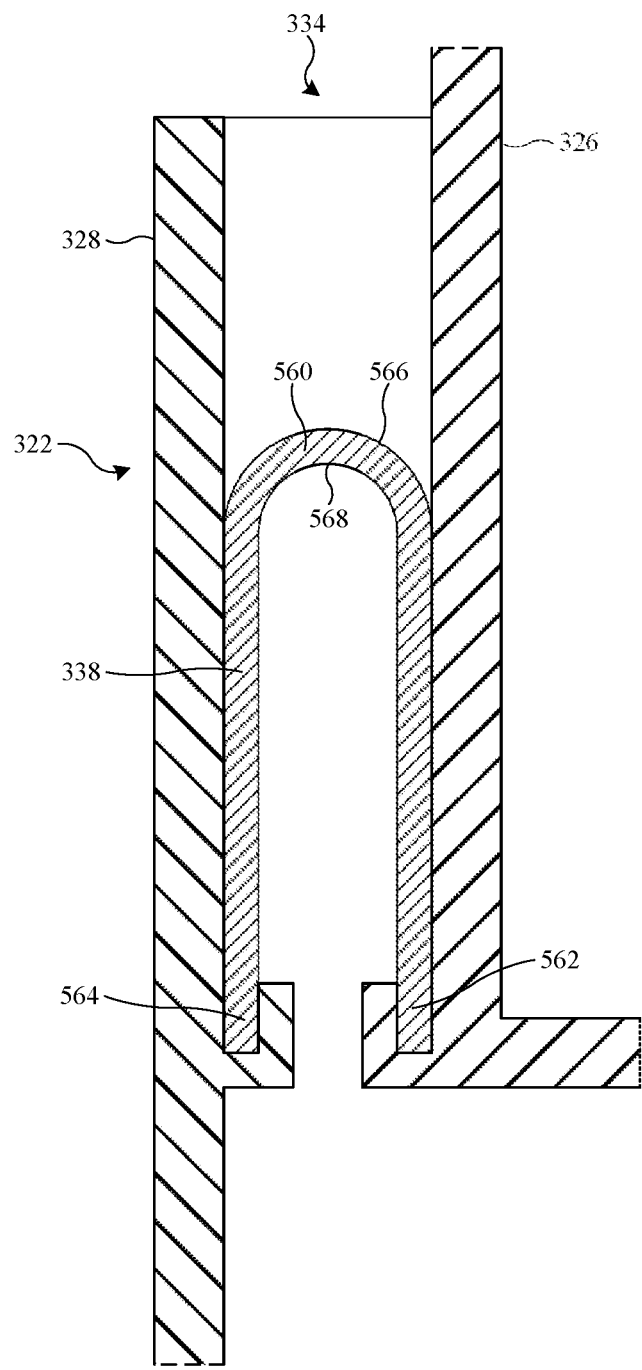
FIG. 5 is a cross-section detail view that shows a portion of the suspension actuator including an air spring membrane of an air spring.

FIG. 5 is a cross-section detail view that shows a portion of the suspension actuator 220 including the air spring membrane 338 of the air spring 322. The air spring membrane 338 is connected to the first housing part 326 and the second housing part 328 in a rolling lobe air spring configuration, as is known in the art. The rolling lobe configuration is characterized by a u-shaped fold 560 that is defined by the air spring membrane 338. The location of the u-shaped fold 560 along the longitudinal length of the air spring membrane 338 changes according to expansion and contraction of the suspension actuator 220.

A first end 562 of the air spring membrane 338 is connected to the first housing part 326 so that the first end 562 moves in unison with the first housing part 326. A second end 564 of the air spring membrane 338 is connected to the second housing part 328 so that the second end 564 moves in unison with the second housing part 328. During relative movement of the first housing part 326 and the second housing part 328, the first end 562 of the air spring membrane 338 and the second end 564 of the air spring membrane 338 translate axially (e.g., in the direction of the longitudinal axis of the suspension actuator 220) with respect to each other. The connections of the air spring membrane 338 to the first housing part 326 and the second housing part 328 may be made directly (e.g., without intervening components) or indirectly (e.g., through intervening components) using known structures to define a sealed interface between the air spring membrane 338 and each of the first housing part 326 and the second housing part 328. Because the u-shaped fold 560 is located between the first end 562 and the second end 564 of the air spring membrane 338, a first side 566 of the air spring membrane 338 faces a wall portion of the first housing part 326 and also faces a wall portion of the second housing part 328, while a second side 568 of the air spring membrane 338 faces the internal chamber 336 of the air spring 322.

As previously described, the shaft 340 of the ball screw actuator 324 is intended to translate axially with respect to the first housing part 326 in response to rotation of the ball nut 342. However, the shaft will rotate in unison with the ball nut 342 instead of translating axially if the torque applied to the shaft 340 by rotation of the ball nut 342 is not reacted.

The suspension actuator 220 does not include a mechanical component that directly engages the shaft 340 and is not rotatable with respect to the ball nut to restrain motion of the shaft 340 to translation relative to the ball nut 342. As an example, known ball screw actuators may include a ball spline that is not rotatable with respect to a ball nut in order to restrain rotation of the ball nut. The suspension actuator 220 does not include a ball spline that functions to restrain rotation of the shaft 340 with respect to the ball nut 342.

Because the shaft 340 is coupled to the second housing part 328 in a manner that does not allow relative rotation (e.g., by the shaft coupler 350), the torque applied to the shaft 340 is likewise applied to the second housing part 328. Because the second housing part 328 is connected to the first housing part 326 by the air spring membrane 338, the air spring membrane 338 reacts the torque applied to the shaft 340.

In the suspension actuator 220, the air spring membrane 338 is configured to resist torsion loads that are applied to the second housing part 328 by the ball screw actuator 324 in order to react the torque applied to the shaft 340. In some implementations, the air spring membrane is the only component of the suspension actuator 220 through which torsion loads are reacted between the shaft 340 and the first housing part 326.

Figure 6:
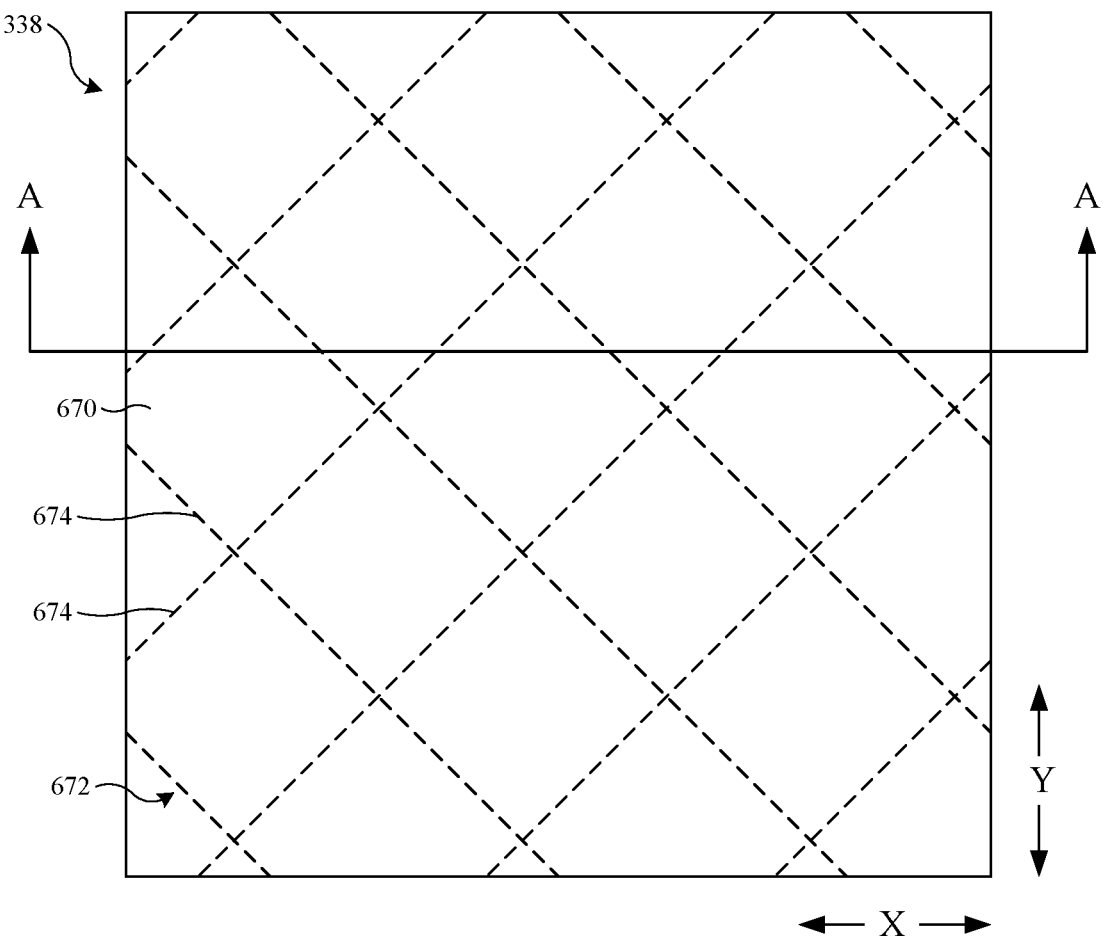
FIG. 6 is a side view that shows a portion of the air spring membrane of the air spring.

FIG. 6 is a side view that shows a portion of the air spring membrane 338 of the air spring 322. The description of the air spring membrane 338 will be made with respect to the orientation of the air spring membrane 338 as installed in the suspension actuator 220, including the circumferential direction (e.g., around the longitudinal axis of the suspension actuator 220, denoted in FIG. 6 as X) and the axial direction (e.g., generally in alignment with the longitudinal axis of the suspension actuator 220, denoted in FIG. 6 as Y). The air spring membrane 338, as installed in the suspension actuator 220 extends in the axial direction and in the circumferential direction except in the area of the u-shaped fold 560, where the orientation changes. This description should be understood as describing orientations of portions of the air spring membrane 338 outside of the area of the u-shaped fold 560.

The air spring membrane 338 is a thin sheet structure that includes a flexible material 670 and a reinforcing structure 672 that is disposed within the flexible material 670 to resist torsion loads that are applied to the air spring 322 by the ball screw actuator 324. By resisting the torsion loads that are applied by the ball screw actuator 324, the flexible material 670 restrains rotation of the shaft 340, thereby allowing the shaft 340 to translate linearly instead of rotating with the ball nut 342.

The flexible material 670 is a flexible and elastic material such as synthetic rubber. For example, the flexible material 670 may be an elastomer. Multiple types of materials may be combined (e.g., by layering) to define the flexible material 670 of the air spring membrane 338.

The flexible material 670 allows the air spring membrane 338 to deform in the presence of an applied loading and elastically return to its original state when the applied loading is removed, which allows the air spring membrane 338 to define the u-shaped fold 560 of the rolling lobe air spring configuration.

The reinforcing structure 672 of the air spring membrane 338 is configured to resist loads that are applied to the air spring membrane 338. The reinforcing structure 672 is configured to increase torsional stiffness of the air spring membrane 338 to allow the air spring membrane to resist torsion loads and react the torque applied by the ball screw actuator 324.

The cords 674 of the reinforcing structure 672 are oriented to resist the output torque of the ball screw actuator 324. In the illustrated implementation, the reinforcing structure 672 of the air spring membrane 338 includes cords 674 that are arranged at a non-zero angle relative to an axial direction of the suspension actuator 220. As one example, at least a portion of the cords 674 may be oriented at a non-zero angle with respect to the suspension actuator 220. As another example, the air spring membrane may be free from reinforcing cords that are aligned with the axial direction of the suspension actuator 220 so that none of the cords 674 extend in the axial direction of the suspension actuator 220.

The angle that the cords 674 are arranged at may be, for example between twenty degrees and seventy degrees relative to the axial direction of the suspension actuator 220. In the illustrated implementation, the cords 674 are arranged according to a first non-zero angle and a second non-zero angle relative to the axial direction of the suspension actuator 220, where the first non-zero angle is different from the second non-zero angle. For example, a first portion of the cords 674 may be angled in a first direction relative to the axial direction of the suspension actuator 220 and a second portion of the cords 674 may be angled in a second direction (e.g., opposed to the first direction) relative to the axial direction of the suspension actuator 220. This type of arrangement can be used to configure the cords 674 of the reinforcing structure 672 in a pattern, such as a crisscross pattern, a grid pattern, a diamond pattern, or another type of pattern. For example, a first group of the cords 674 may be arranged at a first non-zero angle relative to the longitudinal axis of the suspension actuator 220, and a second group of the cords 674 may be arranged at a non-zero second angle relative to the longitudinal axis of the suspension actuator 220, where the first and second non-zero angles are different. As an example, the first non-zero angle may be opposite of the second non-zero angle (e.g., the first angle is a reflection of the second non-zero angle relative to the axial direction of the suspension actuator 220).

The cords 674 are flexible to allow the cords to deform in accordance with deformation of the flexible material 670 as the air spring membrane 338 deforms during extension and retraction of the suspension actuator 220. The cords 674 may be formed from a material that is stiffer than the flexible material 670 (e.g., a first stiffness of the cords 674 is greater than a second stiffness of the flexible material 670). The cords 674 may be formed from an inelastic material. As one example, the cords 674 of the reinforcing structure 672 of the air spring membrane 338 may be formed from a textile material (natural or synthetic). As another example, the cords 674 of the reinforcing structure 672 of the air spring membrane 338 may be formed from metal.

Figure 7:
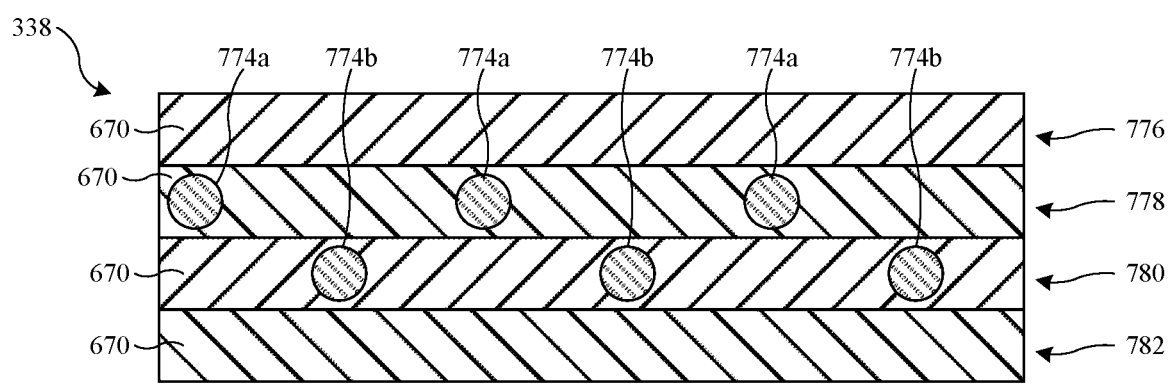
FIG. 7 is a cross-section view of the air spring membrane of the air spring taken along line A-A of FIG. 6.

FIG. 7 is a cross-section view of the air spring membrane 338 of the air spring 322 taken along line A-A of FIG. 6. In the illustrated example, the air spring membrane 338 includes a first exterior layer 776, a first reinforcing layer 778, a second reinforcing layer 780, and a second exterior layer 782. As an example, the first exterior layer 776, the first reinforcing layer 778, the second reinforcing layer 780, and the second exterior layer 782 may be separate sheets of material that are bonded together, e.g., by heat bonding or by adhesives. The first exterior layer 776, the first reinforcing layer 778, the second reinforcing layer 780, and the second exterior layer 782 may each include the flexible material 670.

The first exterior layer 776 and the second exterior layer 782 may be free from reinforcing structures. For example, the first exterior layer 776 and the second exterior layer 782 may be free from reinforcing cords such as the cords 674.

The first reinforcing layer 778 includes a first group of cords 774a (e.g., first cords) that are arranged at a first non-zero angle relative to the axial direction of the suspension actuator 220. The second reinforcing layer 780 includes a second group of cords 774b (e.g., second cords) that are arranged at a second non-zero angle relative to the axial direction of the suspension actuator 220. Thus, the first reinforcing layer 778 defines a first layer of cords (e.g., the first group of cords 774a) and the second reinforcing layer 780 defines a second layer of cords (e.g., the second group of cords 774b), where the first layer of cords and the second layer of cords cooperate to resist torsion loads that are applied to the second housing part 328 of the suspension actuator 220 by the ball screw actuator 324.

Figure 8:
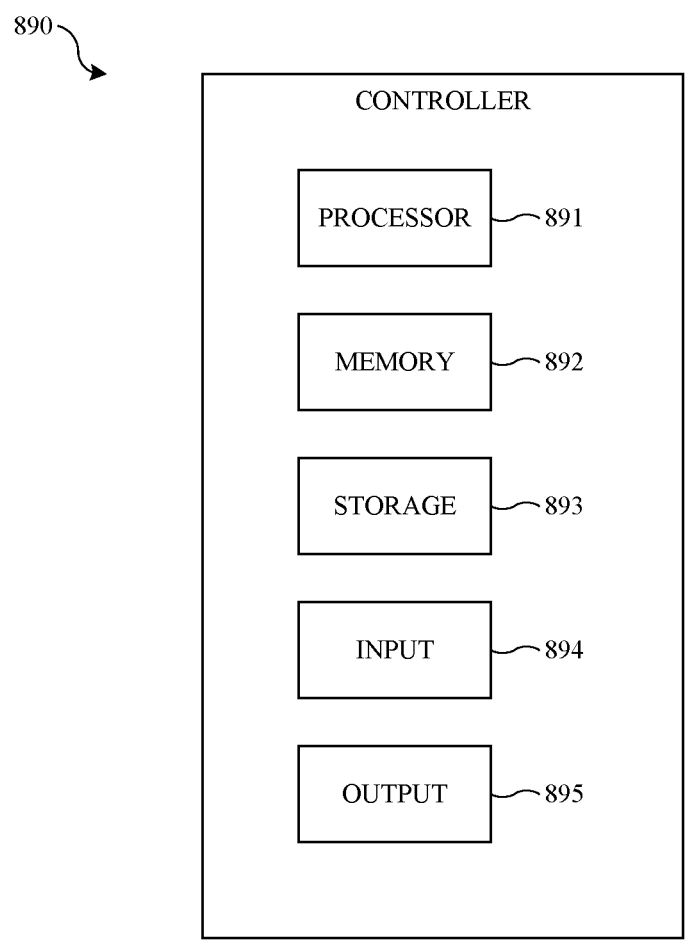
FIG. 8 is a block diagram that shows a controller.

FIG. 8 is a block diagram that shows a controller 890 that may be used to implement the control system 107 and/or other control systems of the vehicle 100. The controller 890 may include a processor 891, a memory 892, a storage device 893, one or more input devices 894, and one or more output devices 895. The controller 890 may include a bus or a similar device to interconnect the components for communication. The processor 891 is operable to execute computer program instructions and perform operations described by the computer program instructions. As an example, the processor 891 may be a conventional device such as a central processing unit. The memory 892 may be a volatile, high-speed, short-term information storage device such as a random-access memory module. The storage device 893 may be a non-volatile information storage device such as a hard drive or a solid-state drive. The input devices 894 may include any type of human-machine interface such as buttons, switches, a keyboard, a mouse, a touchscreen input device, a gestural input device, or an audio input device. The output devices 895 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

As described above, one aspect of the present technology is suspension control, which may, in some implementations, include the gathering and use of data available from various sources to customize operation of an active suspension system based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized suspension control can be performed using non-personal information data or a bare minimum amount of personal information, other non-personal information available to the devices, or publicly available information.

What is claimed is:

1. A suspension actuator, comprising:
   a first housing part;
   a second housing part;
   a ball screw actuator that is connected to the first housing part and to the second housing part; and
   an air spring membrane that is connected to the first housing part and to the second housing part,
   wherein the air spring membrane includes a flexible material and a reinforcing structure that is disposed within the flexible material to resist torsion loads that are applied to the second housing part by the ball screw actuator.

2. The suspension actuator of claim 1, wherein:
   the reinforcing structure includes cords that are arranged at a non-zero angle relative to an axial direction of the suspension actuator,
   the cords are formed from a textile material,
   the air spring membrane is connected to the first housing part and to the second housing part in a rolling lobe configuration,
   the air spring membrane is part of an air spring that includes a working gas that is disposed in an internal chamber that is defined in the first housing part and the second housing part,
   the ball screw actuator includes a rotor,
   the ball screw actuator includes a stator that is operable to rotate the rotor as a result of electromagnetic interaction between the stator and the rotor,
   the ball screw actuator includes a shaft that is connected to the second housing part, and
   the ball screw actuator includes a ball nut that is connected to the rotor and engages the shaft to linearly translate the shaft with respect to the ball nut in response to rotation of the ball nut.

3. The suspension actuator of claim 1, wherein the reinforcing structure of the air spring membrane includes cords that are arranged at a non-zero angle relative to an axial direction of the suspension actuator.

4. The suspension actuator of claim 3, wherein the cords of the reinforcing structure of the air spring membrane are formed from a textile material.

5. The suspension actuator of claim 3, wherein the cords of the reinforcing structure of the air spring membrane are formed from metal.

6. The suspension actuator of claim 1, wherein the reinforcing structure of the air spring membrane includes a first reinforcing layer having first cords that are arranged at a first non-zero angle relative to an axial direction of the suspension actuator and the reinforcing structure of the air spring membrane includes a second reinforcing layer having second cords that are arranged at a second non-zero angle relative to the axial direction of the suspension actuator.

7. The suspension actuator of claim 6, wherein the first cords and the second cords define a crisscross pattern.

8. The suspension actuator of claim 1, wherein the air spring membrane is connected to the first housing part and to the second housing part in a rolling lobe configuration.

9. The suspension actuator of claim 1, wherein the ball screw actuator includes a rotor, a stator that is operable to rotate the rotor as a result of electromagnetic interaction between the stator and the rotor, a shaft that is connected to the second housing part, and a ball nut that is connected to the rotor and engages the shaft to linearly translate the shaft with respect to the ball nut in response to rotation of the ball nut.

10. The suspension actuator of claim 1, wherein the ball screw actuator does not include a ball spline nut that resists the torsion loads.

11. A suspension actuator, comprising:
a top mount;
a bottom mount;
a first load path between the top mount and the bottom mount that includes an air spring; and
a second load path between the top mount and the bottom mount that includes a screw actuator having an output torque,
wherein the air spring includes an air spring membrane having a flexible material and a reinforcing structure that is disposed within the flexible material to react the output torque of the screw actuator.

12. The suspension actuator of claim 11, wherein the reinforcing structure of the air spring membrane includes cords that are oriented to resist the output torque.

13. The suspension actuator of claim 12, wherein the air spring membrane is an annular structure and the cords of the reinforcing structure of the air spring membrane extend in a circumferential direction of the air spring membrane.

14. The suspension actuator of claim 12, wherein the cords of the reinforcing structure of the air spring membrane are formed from a textile material.

15. The suspension actuator of claim 12, wherein the cords of the reinforcing structure of the air spring membrane are formed from metal.

16. The suspension actuator of claim 11, wherein the reinforcing structure of the air spring membrane includes a first reinforcing layer having first cords, the reinforcing structure of the air spring membrane includes a second reinforcing layer having second cords, and the first cords and the second cords are arranged in a grid pattern.

17. A vehicle, comprising:
a vehicle body;
a wheel assembly; and
a suspension actuator that includes:
a top mount that is connected to the vehicle body,
a bottom mount that is connected to the wheel assembly,
a first housing part that is connected to the top mount,
a second housing part that is connected to the bottom mount,
a ball screw actuator having a stator that is connected to the first housing part, a rotor that is rotated by electromagnetic interaction between the rotor and the stator, a shaft that is connected to the second housing part, and a ball nut that is connected to the stator and is engaged with the shaft to linearly translate the shaft in response to rotation of the ball nut, and
an air spring membrane that is connected to the first housing part and to the second housing part in a rolling lobe configuration,
wherein the air spring membrane includes a flexible material, a first layer of cords that are disposed in the flexible material, and a second layer of cords that are oriented at a non-zero angle with respect to the first layer of cords, wherein the first layer of cords and the second layer of cords cooperate to resist torsion loads that are applied to the second housing part by the ball screw actuator.

18. The vehicle of claim 17, wherein the first layer of cords and the second layer of cords define a grid pattern.

19. The vehicle of claim 17, wherein the first layer of cords and the second layer of cords each include reinforcing cords that are formed from a textile material.

20. The vehicle of claim 17, wherein the first layer of cords and the second layer of cords each include reinforcing cords that are formed from metal.

\* \* \* \* \*